United States Patent
Koh et al.

(10) Patent No.: US 8,295,887 B2
(45) Date of Patent: Oct. 23, 2012

(54) METHOD FOR ADJUSTING A RING TONE VOLUME AND MOBILE COMMUNICATION TERMINAL USING THE SAME

(75) Inventors: Jae-Chan Koh, Yongin-si (KR);
In-Kwon Kang, Seoul (KR);
Lae-Kyoung Kim, Ansan-si (KR);
Hyun-Soo Kim, Suwon-si (KR);
Yun-Chul Yi, Seoul (KR); Young-Shik Shin, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 972 days.

(21) Appl. No.: 11/832,480

(22) Filed: Aug. 1, 2007

(65) Prior Publication Data
US 2008/0032750 A1    Feb. 7, 2008

(30) Foreign Application Priority Data

Aug. 1, 2006    (KR) ........................ 10-2006-0072519

(51) Int. Cl.
*H04M 1/00*    (2006.01)
(52) U.S. Cl. ........ 455/567; 455/418; 455/419; 455/420; 455/566; 379/207.16; 379/252; 379/372; 379/373.01; 379/373.02; 379/373.03; 379/373.04
(58) Field of Classification Search .......... 455/418–420, 455/566, 567; 379/207.16, 252, 372–373.04, 379/375.01, 418
See application file for complete search history.

(56) References Cited

U.S. PATENT DOCUMENTS

| 2006/0025120 A1* | 2/2006 | Kuramatsu | 455/418 |
| 2006/0240877 A1* | 10/2006 | Filiba et al. | 455/567 |
| 2008/0009327 A1* | 1/2008 | Westwood et al. | 455/567 |

FOREIGN PATENT DOCUMENTS

KR    1020010017204    3/2001

* cited by examiner

*Primary Examiner* — Dwayne Bost
*Assistant Examiner* — Yungsang Lau
(74) *Attorney, Agent, or Firm* — The Farrell Law Firm, P.C.

(57) ABSTRACT

Disclosed is a method for adjusting a ring tone volume in a mobile communication terminal. The method implements a function by which a user can directly adjust the ring tone volume in a mobile communication terminal in consideration of circumstances. To this end, the present invention includes a user interface screen by which a user can adjust the output volume level of the ring tone which rings according to the passage of time. Thus, the present invention provides a user interface screen by which a user can adjust the output volume level of a ring tone which rings according to the passage of time, and enables the user to set the output level of the ring tone and the output time of the ring tone at a corresponding level according to predetermined intervals through the screen.

6 Claims, 4 Drawing Sheets

METHOD FOR ADJUSTING A RING TONE VOLUME AND MOBILE COMMUNICATION TERMINAL USING THE SAME

PRIORITY

This application claims priority under 35 U.S.C.§119 to an application entitled "Method For Adjusting Ring Tone Volume and Mobile Communication Terminal Using The Same" filed in the Korean Intellectual Property Office on Aug. 1, 2006 and assigned Serial No. 2006-72519, the contents of which are incorporated herein by reference.

BACKGROUND OF THE INVENTION

1. Field of the Invention

The present invention relates generally to a method for adjusting a ring tone volume and a mobile communication terminal using the same, and in particular, to a method for adjusting a ring tone volume and a mobile communication terminal using the same, by which it is possible to adjust a ring tone volume in consideration of the place and circumstance where a ringer sounds.

2. Description of the Related Art

As mobile communication terminals have become a popular part of daily life, users have frequently changed ring tones of a mobile communication terminal according to a fashion or the user's own inclination. The ring tone of a mobile communication terminal can also be set to have various melodies and various sounds according to various desires of users. Thus, there are many service providers which provide various ring tones, so that users can download a desired ring tone to their terminals.

Generally, once the ring tone volume of a mobile communication terminal has been set at a single level corresponding to a volume which a user regards as suitable, the set ring tone volume is maintained before it is reset by the user.

However, most mobile communication terminals allow a ring tone to ring at a single level set by users. Therefore, the ring tone volume may be so low that the user cannot recognize it or the ring tone volume may be so high that it may interrupt other people. That is, if the ring tone rings at a high volume level in a quiet place, it may interrupt people nearby the user, and if the ring tone volume rings at a low level in a noisy place, it is so low that the user cannot hear it.

As described above, a mobile communication terminal is used under various circumstances such as public libraries, meeting places, performance places, etc. However, according to the conventional art, since it is only possible to adjust the ring tone volume, the ring tone continuously rings at only the high level or the low level regardless of changing circumstances.

As described above, in the conventional art, many methods related to the ring tone change of a mobile communication terminal have been provided in order to satisfy user requirements. However, there has been no method by which a user can directly adjust ring tone volume by means of a desired scheme according to circumstances.

SUMMARY OF THE INVENTION

It is, therefore, an object of the present invention to provide a method for adjusting a ring tone volume and a mobile communication terminal using the same, by which it is possible for a user to adjust the ring tone volume in consideration of the place and circumstance.

In accordance with an aspect of the present invention, there is provided a method for adjusting a ring tone volume in a mobile communication terminal. The method includes determining if there is a user's request for setting an output level of the ring tone volume as a multilevel; displaying a screen for setting the output level and duration of the ring tone according to at least one interval in response to the request; storing settings for the output level and the duration input by the user through items displayed on the screen; and allowing the ring tone to ring at the set output level according to the interval for the duration set in the corresponding interval when a call is received.

In accordance with another aspect of the present invention, there is provided a mobile communication terminal for adjusting the ring tone volume, the mobile communication terminal including a controller for controlling an output level adjustment screen to be displayed if there is a user's request for setting an output level of the ring tone volume as a multilevel, and for controlling the ring tone to ring at the set output level according to at least one interval for duration set in the corresponding interval through a speaker when a call is received; a memory for storing settings for the output level and the duration input by the user through items displayed on the output level adjustment screen; and a display unit for displaying the output level adjustment screen for setting the output level and the duration of the ring tone according to the at least one interval.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
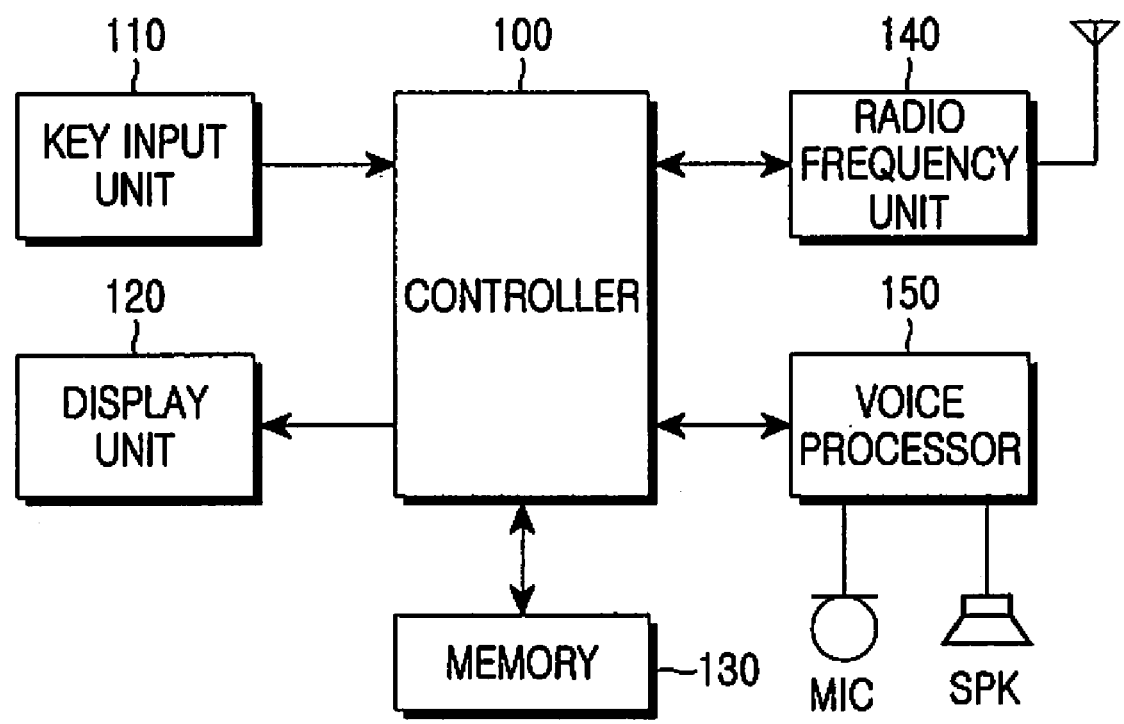
FIG. 1 is a block diagram illustrating the construction of a mobile communication terminal for providing a function of adjusting a ring tone volume according to the present invention.

Preferred embodiments of the present invention will be described in detail herein below with reference to the accompanying drawings. It should be noted that the similar components are designated by similar reference numerals although they are illustrated in different drawings. Also, in the following description, a detailed description of known functions and configurations incorporated herein will be omitted when it may obscure the subject matter of the present invention.

The present invention implements a function by which a user can directly adjust a ring tone volume in a mobile communication terminal in consideration of circumstances. As such, the present invention includes a user interface screen by which a user can adjust an output volume level of the ring tone, which rings according to the passage of time. Thus, the present invention provides a user interface screen by which a user can adjust the output volume level of a ring tone which rings according to the passage of time, and enables the user to set the output level of the ring tone and the output time of the ring tone at a corresponding level according to predetermined intervals through the screen. Thus, the user can directly set the ring tone volume of the mobile communication terminal to ring at a desired output level for a desired time. For example, the user may not be embarrassed even when the ring tone rings in a quiet place and also recognize call reception even when the user stays in a very noisy place. Accordingly, the user's convenience can be improved.

Hereinafter, an element and an operation of a mobile communication terminal having a function as described above will be described with reference to FIG. 1. FIG. 1 is a block diagram illustrating the construction of a mobile communication terminal for providing a function of adjusting a ring tone volume according to the present invention.

First, a controller 100 controls the overall operation of the mobile communication terminal such as communication and data transmission/reception. Specifically, in the present invention, the controller 100 controls a method for adjusting the output level of a ring tone volume on a step-by-step basis according to a user's setting. In detail, if a request for adjusting the output level of the ring tone volume is received from a user, the controller 100 displays an output level adjustment screen on a display unit 120. The output level adjustment screen is for setting the output level and the duration of a ring tone according to one or more intervals.

If the output level according to each interval and the duration according to each step are set by the user through the screen, the controller 100 controls the ring tone volume to be adjusted according to the set results. That is, the controller 100 controls the ring tone to ring at the output level set according to one or more intervals for the duration set corresponding to a certain interval through a speaker when a call is received. To this end, when the controller 100 controls the ring tone to ring in a call reception, it adjusts the output gain of an audio coder/decoder (codec) according to the user's setting. Thus, when a call is received, the controller 100 controls the ring tone to ring at a multilevel having different levels according to the predetermined intervals.

A key input unit 110 is connected to the controller 100 and includes a plurality of numeral keys and character keys. In the present invention, the key input unit 110 transmits control signals to the controller 100, the control signals controlling movement and selection of a user regarding each setup item of output levels according to the predetermined intervals.

The display unit 120 may include a display device such as a Liquid Crystal Display (LCD), and displays a screen for adjusting the output level of the ring tone volume according to each interval in accordance with the present invention. Herein, if the display unit 120 employs a touch screen type, it displays the screen and simultaneously transmits control signals for the output level setup item to the controller 110, similarly to the key input unit 110.

A memory 130 includes a Read Only Memory (ROM) and a Random Access Memory (RAM) for storing a plurality of programs and data. In particular, the memory 130 stores data for displaying the output level adjustment screen to be displayed according to the present invention. The memory 130 also stores data generated when a user sets the output level and the duration according to each interval through the output level adjustment screen.

A Radio Frequency (RF) unit 140 is connected to the controller 100, and converts voice and control data into RF signals to transmit the RF signals. The RF unit 140 also receives RF signals, and converts the RF signals into voice and control data to output the voice and control data.

A voice processor 150 is connected to the controller 100, converts voice data from the controller 100 into audible sounds to output the audible sounds through a speaker, and converts voice signals received from a microphone into data so as to transmit the data to the controller 100.

Figure 2:
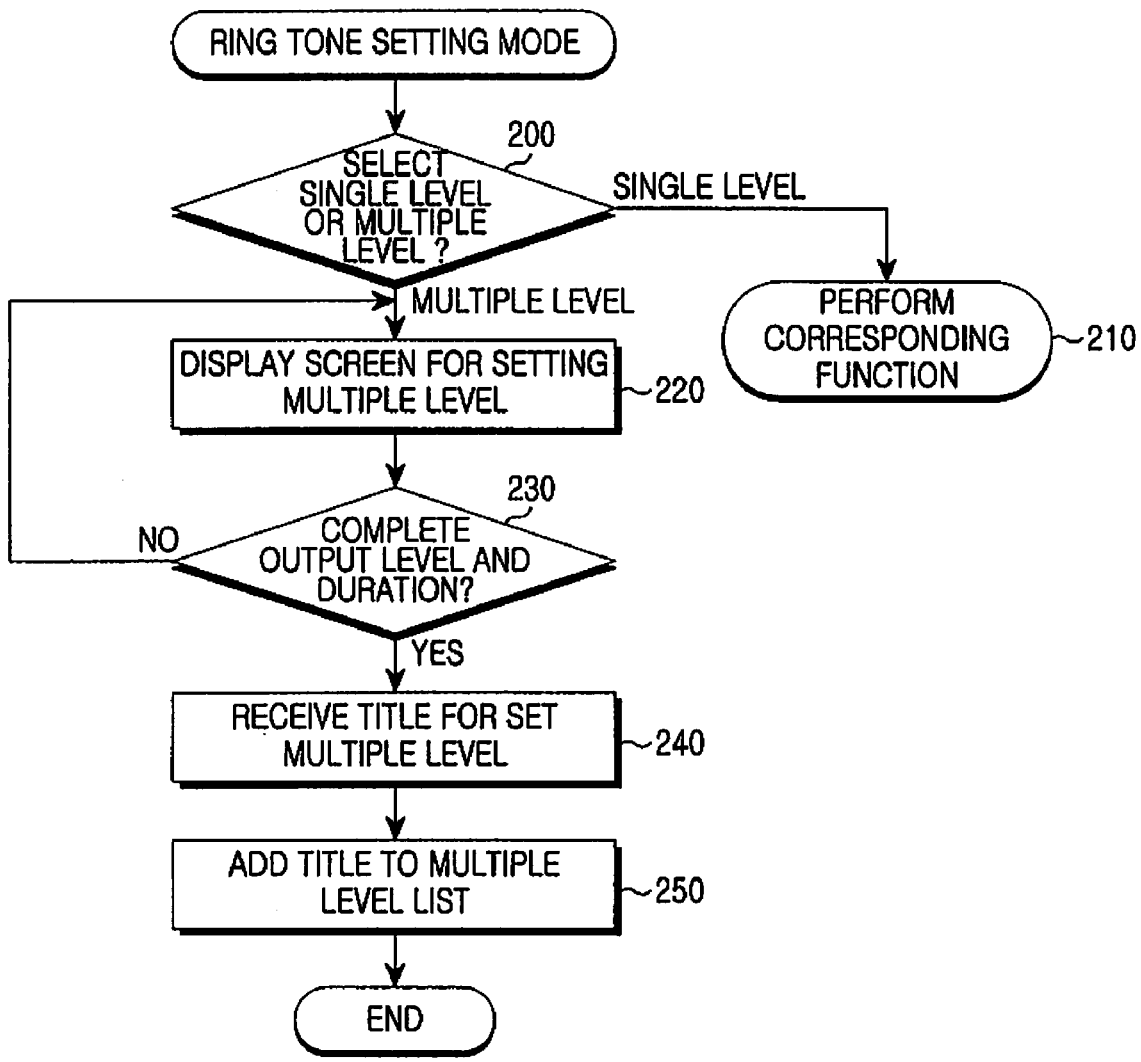
FIG. 2 is a flow chart illustrating control flow for adjusting an output level of a ring tone volume according to predetermined intervals in accordance with the present invention.

FIG. 2 is a flow chart illustrating a control flow for setting the output level according to predetermined intervals in the mobile communication terminal having the construction as described above. FIG. 3 is a view illustrating a screen according to movement among menu items for a ring tone setting in accordance with the present invention.

Figure 3A:
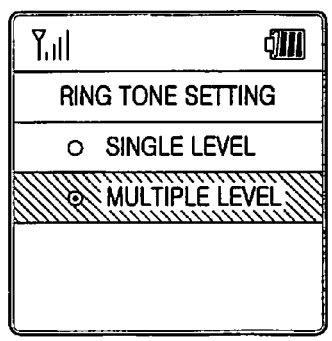
FIG. 3A-3C is a view illustrating a screen regarding movement among menu items for a ring tone setting according to the present invention.

Referring to FIG. 2, if a ring tone setting mode is selected by a user, the controller 100 displays a screen for selecting one of a single level and a multilevel as illustrated in FIG. 3A. FIG. 3A is a view illustrating a screen including a menu for selecting the single level representing the output level of the conventional ring tone volume or the multilevel to which the present invention is applied.

Figure 4:
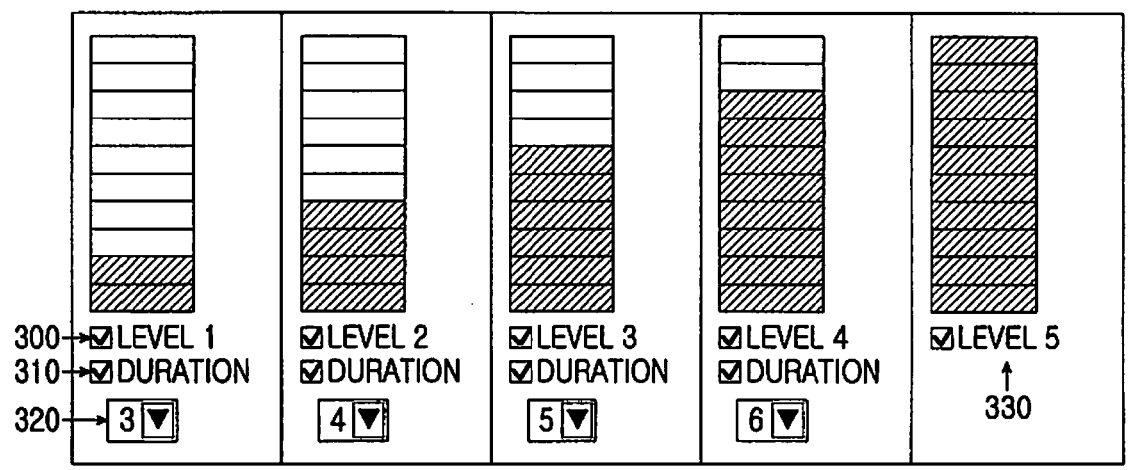
FIG. 4 is a view illustrating a method for setting a multilevel on an output level adjustment screen according to the present invention.

In step 200, if the single level is selected by the user, the controller 100 sets the ring tone to ring at a single volume level similarly to a conventional scheme in step 210. That is, the controller 100 performs a corresponding function based on a conventional ring tone setting. Therefore, when a call is received, the controller 100 controls the ring tone to ring at the preset single level. However, if the multilevel is selected, the controller 100 displays a multilevel setup screen as illustrated in FIG. 4 in step 220. Hereinafter, FIG. 4 will be described in detail.

Figure 3B:
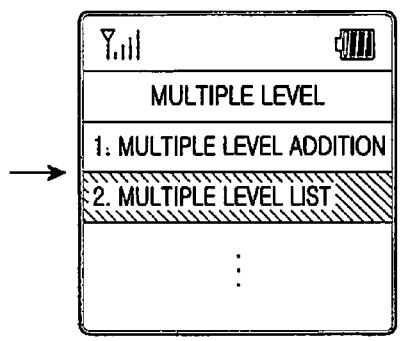
Figure 3C:
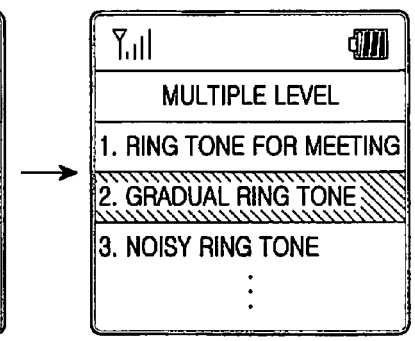

According to another embodiment of the present invention, a sub-menu for the multilevel as illustrated in FIG. 3B may be displayed before displaying the multilevel setup screen. The sub-menu for the multilevel includes items having a 'multilevel addition,' a 'multilevel list,' etc, and enables the user to set a multilevel. For example, even when the user sets the multilevel so that the ring tone gradually rings at a higher output level, it is possible to set the ring tone to ring at a low output level for a relatively long time and then ring at a high output level only in the last interval. In addition, it is also possible to set the ring tone to ring at a low output level for a short time and then ring at a high output level for a relatively long time. After setting the multilevel, the user can freely determine and store titles. Accordingly, as illustrated in FIG. 3C, the user can also set the multilevel in advance by freely defining the titles as 'ring tone for meeting,' 'noisy ring tone,' etc. The 'ring tone for meeting' is set to ring at a low output level for a relatively long time, and 'the noisy ring tone' is set to ring at a higher output level for a long time.

In yet another embodiment of the present invention as described above, it is also possible to provide the multilevel list as illustrated in FIG. 3B such that a user can select a proper multilevel in consideration of circumstances from various multilevels set in advance.

Meanwhile, if the multilevel setup screen is displayed in step 220, the user can set the output level and the duration of the ring tone according to the predetermined intervals through the displayed screen. In step 230, the controller 100 determines if the settings for the output level and duration have been completed according to the predetermined intervals. If the settings have been completed, the controller 100 receives titles for the set multilevel from the user in step 240, and adds the received titles to the multilevel list in step 250. If the settings of the output level and the duration have been completed according to the predetermined intervals in step 230, it is possible to directly store the set values without a separate title input process. If a specific multilevel is set by the user, the mobile communication terminal adjusts the ring tone volume on a step-by-step basis according to the set multilevel, and allows the ring tone to ring when a call is received.

FIG. 4 is a view of the output level adjustment screen including items for setting output levels and durations in at least two intervals according to the selection of a user for setting the multilevel.

FIG. 4 illustrates setup items for setting levels and durations of the levels in five intervals. The user can set the output levels of the ring tone volume from the first interval to the fifth interval as indicated by reference 330, respectively. As indicated by reference 300, the user activates check boxes indicating the output level for each interval, thereby dividing the whole interval by the number of desired intervals. Herein, the output level can be adjusted by using a volume adjustment key provided on the side of the mobile communication terminal.

As illustrated in FIG. 4, the screen for adjusting the output level includes check boxes and roll-down boxes. The check boxes are for setting whether each interval has been activated so that the ring tone can ring at a different output volume level according to one or more intervals. The roll-down boxes are for setting time during which the ring tone rings at the set output level of each interval.

For example, if the user activates the check box for the duration as indicated by reference 310, the roll-down box as indicated by reference 320 is activated, thereby setting the duration. If the user does not activate the check box for the duration, both the roll-down box corresponding to the check box and the check box for the duration corresponding to a subsequent interval are deactivated, thereby allowing the ring tone to ring at the output level of a previous interval.

Figure 5:
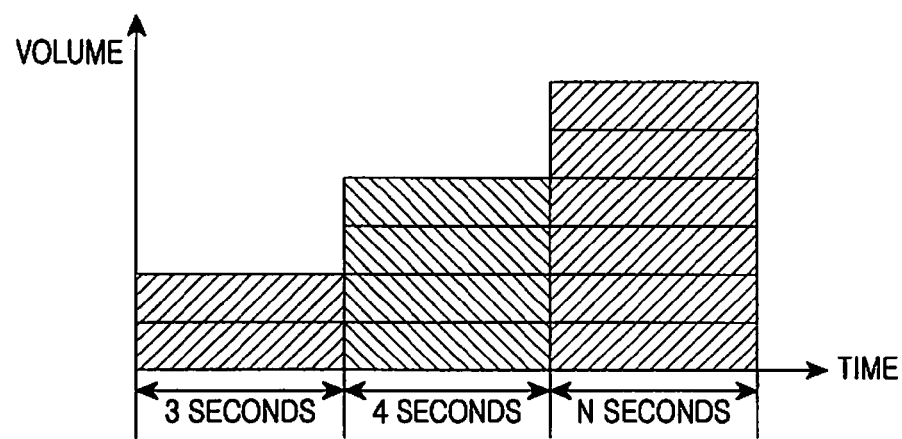
FIG. 5 is a view for explaining an operation at the time of setting a multilevel according to the present invention.

The operation for setting the multilevel ring tone volume will be described with reference to FIG. 5. For example, if the user does not activate the duration in the third interval, the ring tone rings in the first interval for 3 seconds, rings in the second interval for 4 seconds, and continually rings in the third interval according to the set level of each interval. Since the present invention provides the user interface for adjusting the output level, if the user sets a desired output level and duration according to a corresponding interval through the user interface, and the audio codec adjusts an audio output gain according to the set values and outputs the ring tone on a step-by-step basis according to the set output level and the set duration. Therefore, if the ring tone rings at a low volume level in a quiet place, the user can directly answer the telephone. Even when the ring tone rings in a noisy place, the user can set the ring tone to ring at a significantly high volume level after several intervals, thereby reducing the probability that the user does not answer the telephone.

According to the present invention as described above, a user can directly set the ring tone volume at multilevels, so that the user can recognize call reception without confusion because the ring tone rings on a step-by-step basis until the user answers the telephone from the ringing of the ring tone, which is advantageous for improving a user's convenience.

Although preferred embodiments of the present invention have been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A method for adjusting a ring tone volume in a mobile communication terminal, the method comprising the steps of:
   determining if there is a request by a user for setting a multilevel ring tone volume having two or more intervals;
   displaying a screen, in response to the request, that allows the user to activate the two or more intervals from a plurality of intervals, to set an output volume level of a ring tone for each of the two or more intervals, and to set a duration for each of the two or more intervals;
   storing settings for the output volume levels and the durations input by the user through items displayed on the screen;
   setting a title for the multilevel ring tone volume and storing the title of the multilevel ring tone volume in a multilevel list; and
   allowing the ring tone to ring through the two or more intervals according to the user-set output volume levels and the user-set durations for each of the two or more intervals of the multi-level ring tone when the user selects the title of the multilevel ring tone volume from the multilevel list and a call is received.

2. The method as claimed in claim 1, wherein storing settings for the output volume levels and durations comprises:
   determining if the settings for the output volume level and the duration have been completed for each of the two or more intervals;
   setting the title for the multilevel ring tone volume if the settings have been completed.

3. The method as claimed in claim 1, wherein the screen includes:
   check boxes for setting whether each interval has been activated so that the ring tone can ring at a different output volume level according to the interval; and
   roll-down boxes for setting time during which the ring tone rings at the set output level of each interval.

4. The method as claimed in claim 1, further comprising:
   determining whether there is a user request for setting the ring tone volume as a single level ring tone volume; and
   if there is the request for setting the output level as the single level ring tone volume, allowing the ring tone to ring at a preset single level when a call is received.

5. A mobile communication terminal for adjusting a ring tone volume, the mobile communication terminal comprising:
   a controller for controlling an output level adjustment screen to be displayed if there is a request by a user for setting a multilevel ring tone volume having two or more intervals, setting a title for the multilevel ring tone volume, and for controlling a ring tone to ring through the two or more intervals according to user-set output volume levels and user-set durations for each of the two or more intervals of the multi-level ring tone through a speaker when the user selects a title of the multilevel ring tone volume from a multilevel list and a call is received;
   a memory for storing settings for the output volume levels and the durations input by the user through items displayed on the output level adjustment screen, and storing the title of the multilevel ring tone volume in the multilevel list; and
   a display unit for displaying the output level adjustment screen that allows the user to activate the two or more intervals from a plurality of intervals, to set the output volume level of the ring tone for each of the two or more intervals, and to set the duration for each of the two or more intervals.

6. The mobile communication terminal as claimed in claim 5, wherein the controller determines if the settings for the output volume level and the duration have been completed for each of the two or more intervals through the items displayed on the output level adjustment screen, and, if the settings have been completed, the controller sets the title for the multilevel ring tone volume.

* * * * *